Patented June 9, 1953

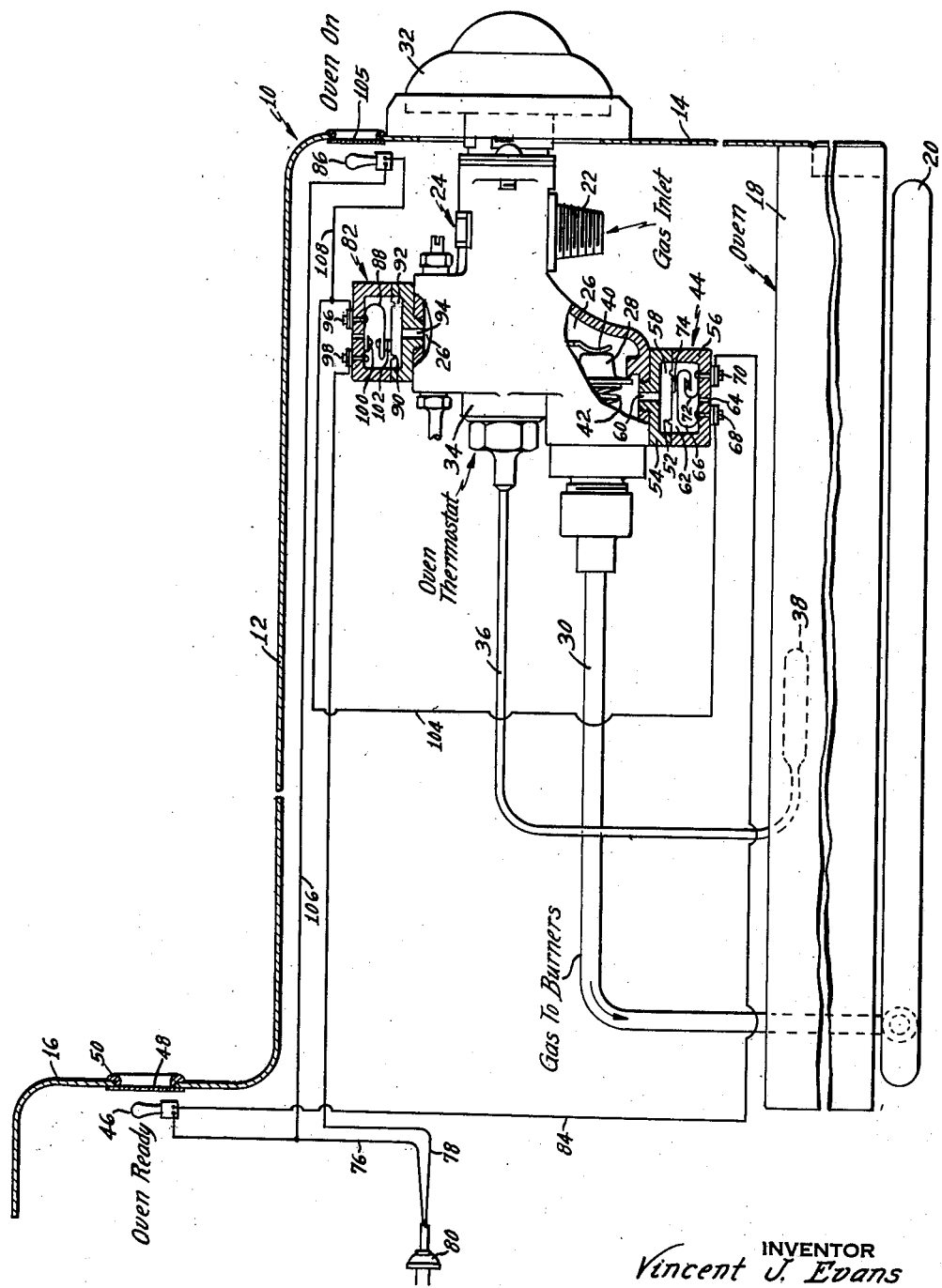

2,641,750

UNITED STATES PATENT OFFICE 2,641,750

INDICATOR SYSTEM FOR GAS HEATED APPLIANCES

Vincent J. Evans, Lakewood, Ohio, assignor to The Wilcolator Company, Elizabeth, N. J., a corporation of Delaware Application January 27, 1951, Serial No. 208,171

4 Claims. (Cl. 340—222)

My invention relates to improvements in thermostatic controls for gas heated appliances, such as gas heated ovens, and domestic gas ranges.

The primary object of the invention is to provide a control of the type referred to including means for automatically actuating an indicator adapted to show the condition of operation of the appliance.

Another object of the invention is to provide a simple and effective system for indicating when a gas heated oven is up to temperature and ready for use.

Pilot or indicator lights are provided on electrically heated ovens without difficulty. Such lights are not employed on gas heated ovens, apparently because of the problems and difficulties involved. I have overcome these difficulties by modifying a gas thermostat so as to provide means for operating one or more pilot or indicator lamps, particularly for indicating when the oven is up to the desired temperature and ready for use.

In accordance with my invention, the improved indicator system for thermostatically controlled gas heated appliances comprises an electric indicator, such as a pilot light, for indicating when the oven is heated to the required temperature and ready for use, and a pressure responsive electric switch for controlling the supply of electric current to the indicator, said switch being operatively associated with the thermostat controlling the supply of gas to the appliance for subjecting said switch to the gas pressure at the outlet of the thermostat, whereby a reduced gas pressure is applied to the switch when the thermostat reduces or cuts off the gas flow to the appliance as the required temperature is reached therein, thereby actuating the switch to operate the electric indicator.

In a preferred construction a control is provided comprising a thermostat, a pressure switch including a pressure responsive member such as a diaphragm forming a wall of a pressure chamber, and means for connecting said chamber into the gas outlet of the thermostat. In this construction the switch includes a contact arm controlled by the pressure responsive member and arranged to close a circuit when the pressure of the gas at the outlet of the thermostat and in the switch chamber is reduced a given amount below that of the gas pressure in the thermostat or the inlet thereto, as occurs when the temperature of the oven reaches the ready temperature.

The indicator system and the control therefor preferably include means for preventing actuation of the ready indicator when the thermostat is in the "off" position. In an advantageous construction, this means is combined with or is used to operate an indicator lamp to show when the gas is turned "on," and comprises a pressure switch responsive to the pressure of the gas in or supplied to the thermostat when the gas is turned on. In this construction the pressure switch is arranged to control the supply of current to the "on" indicator lamp and also to the pressure switch for the oven ready indicator, whereby the latter indicator can be energized only when the thermostat is set to an "on" position.

The system and thermostatic control of the present invention include other features and advantages described hereinafter in connection with an illustrative embodiment thereof shown in the accompanying drawing comprising a part of this application.

The single figure of the drawing is a broken vertical sectional view of the pertinent parts of a gas stove provided with the indicator system and control of the present invention.

In the drawing, the indicator system is shown in connection with a domestic gas stove 10 having a top 12, a front 14 and a raised back 16. The stove includes an oven 18 heated by a gas burner 20. Gas for heating the oven is supplied from a gas input manifold, connected in the usual way to an inlet 22 of an oven thermostat 24. The gas flows from the inlet 22 into a chamber 26 in the body of the thermostat and through a thermostatically controlled throttling valve 28 and a line 30 to the burner 20.

The oven thermostat 24, per se, is of conventional well known construction and includes a hand operated dial 32 mounted at the front of the oven, a temperature responsive mechanism of known type located at 34 and connected by a capillary 36 to a bulb 38 mounted in the oven 20. The dial 32 is provided with a setting for "off" position and graduated temperature settings from 150° to 550° F., in accordance with the usual practice. The dial in the particular thermostat shown, when turned from "off" position, opens a plug type cut-off valve, built into the thermostat adjacent the inlet connection 22, to permit gas to flow from the inlet into the thermostat chamber or space 26 between the cut-off valve and the throttle valve 28. The dial 32 actuates the temperature responsive means indicated at 34, which includes an arm 40, to set the temperature at which the throttling valve 28 is closed under the action of a biasing spring 42. The cut-off valve may be in the gas line leading to the inlet 22, instead of being a part of the thermostatic control.

The oven thermostat 24, illustrated in the drawing, operates in the usual way so that when the oven 18 is cold and the dial 32 is turned from "off" position to a temperature of 400° F., for example, gas is admitted to the chamber 26 through the inlet 22 and the lever 40 is actuated to open the valve 28 to permit gas to flow at full volume through the line 30 to the burner 20. When the temperature in the oven reaches the set temperature, the fluid in the bulb 30 expands to actuate the thermostat to move the lever 40 to the right and the valve 28 toward closed position, to allow a small flow or to cut off the gas flow completely. Later, as the oven cools, as when cold food is placed therein, the throttling valve 28 is opened to supply gas to the oven to bring it back to the set temperature.

The indicator system illustrated in the drawing includes a pressure-responsive electric switch 44, connected to the outlet of the thermostat down stream of the valve 28, and a "ready" indicator lamp 46 mounted in back of the raised panel 16 of the stove so that its light shines through a green, or other colored, panel or window 48, mounted in a frame 50. The indicator window may be in the front panel of the stove, or at some other desired location.

The pressure switch 44 comprises a flexible diaphragm 52, the peripheral edge of which is clamped between facing peripheral faces of casing sections 54 and 56 of the switch 44, to form a gas-tight chamber 58 which is connected into the gas outlet of the thermostat by a conduit or passageway 60. A chamber 62 is provided in the casing section 56 and is vented to the atmosphere by a passageway 64. Since the chamber 58 is connected into the thermostat at a position down stream of the valve 28, the gas pressure in this chamber is the same as that down stream of the valve 28 or in the gas line 30.

The lower portion of the casing 56 of the pressure switch, inside the chamber 62, carries a spring switch arm 66 held in place by a terminal screw or rivet 68. Another terminal screw or rivet 70 secures a contact-carrying member 72 in place with its contact overlying the contact of the movable end of the arm 66. The diaphragm 52 carries a block or plate 74 of insulating material which engages the arm 66, this arm being normally biased to contact-closing position.

Current supply leads 76 and 78, extending from a plug 80 adapted to connect into a source of electric current, such as the usual 115 volt supply, connect into the electric lamp 46 and one terminal of a second pressure switch 82, respectively. The lamp 46 is connected by a lead 84 into one of the terminals of the pressure switch 44, i. e., terminal 70. The pressure switch 82 is provided to limit the operation of the the indicator lamp 46 and operate a second or "on" lamp 86.

The switch 82 is constructed like the switch 42 except that the spring contact arm 88 is normally biased to open position. This switch includes a diaphragm 90 and a pressure chamber 92 connected by a passageway 94 with chamber 26 of the thermostat so that the switch is subject to the gas pressure at the inlet of the thermostat, up stream of the throttle valve 28. The spring arm 88 is mounted in place by a terminal screw 96, while a second terminal screw 98 is connected to and positions a contact 100 for engagement by the contact of the switch arm 88. A block or plate 102 of insulating material is carried on the diaphragm 90 and engages the arm 88 to close the switch when the gas is turned on and applies pressure in the chamber 92.

The switches 44 and 82 are connected in series by a lead wire 104 attached to terminals 68 and 96. The lamp 86 is mounted in back of a window 105 and connected by one wire 106 with the lead wire 76 and by a second lead wire 108 with the terminal 96 of switch 82.

In the normal operation of the system shown in the drawing, the lamp 86 is lighted when the gas is turned on and the lamp 46 is lighted when the oven reaches the set temperature and is ready for use. For example, assume that the operator desires to roast a cut of meat, he turns the dial 32 to the desired oven temperature, for example 350° F. This operation, since the oven is cold, not only admits gas from the gas inlet to the thermostat chamber 26, but also opens the throttling valve 28. As the gas flows through the chamber 26, around the valve 28 and through the line 30, the pressure in the chamber 26 and that down stream of the valve 28 are essentially the same, transmitting equal gas pressures to the pressure switches 44 and 82 to move the diaphragms 52 and 90 to close the switch 82 and open the switch 44.

The closing of the switch 82 closes a circuit through leads 76, 106, lamp 86, lead 108, switch 82 and lead 78, lighting the "on" lamp 86. This lamp shows to the operator that the oven is "on," and as long as there is gas pressure in the thermostat the lamp remains lighted. When the switch 82 is closed a circuit is also prepared to one side of the switch 44 from terminal 96 via lead 104, but this switch is being held open by the pressure of the gas being supplied to the oven.

However, as the oven reaches the set temperature, the temperature responsive means moves the valve 28 to closed or substantially closed position, thereby reducing the pressure down stream of the valve and in the chamber 58 of switch 44 permitting the switch arm 66 to close the switch and light the "ready" indicator lamp 46, thereby indicating to the operator that the oven is ready to receive the cut of meat to be roasted. In addition to the lead 76, the circuit for the lamp 46 includes lead 78, switch 82, lead 104, switch 44 and lead 84.

If, at the beginning of the roasting operation, the oven cools, the valve 28 will open so that the gas pressure in the pressure switch 44 will rise again causing the switch 44 to open and lamp 46 to go out. As long as the oven is at the set temperature, the indicator lamp 46 will remain lighted.

If the dial 32 should, at some time during the roasting operation, be turned to a higher temperature, the lamp 46 will be switched off, and then on again when the higher temperature is reached in the oven. If an unusually heavy load is placed in the oven, the lamp 46 will go out and relight as soon as the oven again reaches the set temperature. The "on" indicator light 86 is switched off when the dial of the thermostat is turned to "off" and the switch 82 opens. This switch controls the supply of current for both lamps, and when it is open the lamp 46 will be off even though switch 44 is closed.

The diaphragms 52 and 90 may be made of any suitable material such, for example, as nylon fabric impregnated with Buna rubber. The switch casings and the diaphragms are advantageously made large enough in diameter for the diaphragms to operate the switches at the gas pressure normally employed.

The pressure switches may comprise other pressure responsive means than a diaphragm so long as it is sufficiently sensitive to be operable at the commonly used gas pressures.

While the appliance or oven is advantageously equipped with the "on" lamp 86 it may be provided only with the "oven ready" lamp 46, controlled in the manner described above. Other indicator means may be employed in place of or in addition to the indicator lamps.

What I claim is:

1. A gas heated appliance comprising a gas heating means, a thermostat including a control valve for regulating the supply of gas to the heating means in response to changes in the temperature of the appliance, an electrical "ready" indicating means for indicating when the appliance is heated to a predetermined temperature set by the thermostat, a first pressure switch responsive to changes in gas pressure for controlling the supply of electric current to the "ready" indicating means, said switch including a switch closing member normally biased to closed position, means for conducting gas from the downstream side of said control valve to said pressure switch to move said member to open position, a second pressure switch responsive to changes in gas pressure and having a switch closing member biased to open position, means for supplying current from the second switch to the first switch, and means for conducting gas from the upstream side of said control valve to said second switch to move its closing member to closed position, whereby closing of said valve by the thermostat reduces the gas pressure on said first pressure switch permitting its switch closing member to move to closed position and thereby actuate said indicating means.

2. A gas heated appliance comprising a gas heating means, a thermostat including a control valve for regulating the supply of gas to the heating means in response to changes in the temperature of the appliance, an electrical indicating means for indicating when the appliance is heated to a predetermined temperature set by the thermostat, a first pressure switch responsive to changes in gas pressure for controlling the supply of electric current to the indicating means, said switch including a switch closing member normally biased to closed position, a flexible diaphragm for actuating said member to open position, means for conducting gas from the downstream side of said control valve to the side of said diaphragm opposite said member, a second pressure switch responsive to changes in gas pressure for controlling the supply of electric current to said first switch, and means for conducting gas from the up-stream side of said control valve to said second switch to move it to closed position, whereby closing of said valve by the thermostat during operation of the appliance reduces the gas pressure on said diaphragm to permit said first switch to close and energize said indicating means.

3. A gas heated appliance comprising a gas heating means, a thermostat including a control valve for regulating the supply of gas to the heating means in response to changes in the temperature of the appliance, an electrical "ready" indicating means for indicating when the appliance is heated to a predetermined temperature set by the thermostat, a first pressure switch responsive to changes in gas pressure for controlling the supply of electric current to the "ready" indicating means, said switch including a switch closing member normally biased to closed position, means for conducting gas from the down-stream side of said control valve to said pressure switch to move said member to open position, an "on" electrical indicating means for indicating when the gas is turned on, a second pressure switch responsive to changes in gas pressure for controlling the supply of electric current to said first switch and to said "on" indicating means, said second switch being biased to open position, and means for conducting gas from the up-stream side of said control valve to said second switch to move it to closed position, whereby closing of said valve by the thermostat during operation of said appliance reduces the gas pressure on said first switch to permit said member to close and energize said "ready" indicating means.

4. A gas-heated appliance comprising a gas heating means, a pipe for conducting gas to the heating means, a thermostat including a control valve in said pipe for regulating the supply of gas to the heating means in response to changes in the temperature of the appliance, an electrical "ready" indicating means for indicating when the appliance is heated to a predetermined temperature set by the thermostat, a first pressure switch responsive to changes in gas pressure for controlling the supply of electric current to the "ready" indicating means, said switch including a switch-closing member normally biased to closed position, means for conducting gas from the downstream side of said control valve to said pressure switch to move said switch-closing member to open position when the valve is open and gas is being supplied to the heating means to heat up the appliance, a second pressure switch responsive to changes in gas pressure and connected into a source of electric current, said second pressure switch having a switch-closing member biased to open position, means for supplying electric current from the second switch to the first switch, and means for conducting gas from the upstream side of said control valve to said second switch to move its switch-closing member to closed position and connect the current source to said first switch when gas is supplied to the upstream side of said control valve, the closing of said control valve by the thermostat acting to reduce the gas pressure on said first pressure switch permitting its switch closing member to move to closed position and thereby supply current to said electrical "ready" indicating means to indicate that the appliance is heated to said predetermined temperature.

VINCENT J. EVANS.

References Cited in the file of this patent

UNITED STATES PATENTS

| Number | Name | Date |
| --- | --- | --- |
| 1,177,857 | Gilbert | Apr. 4, 1916 |
| 2,240,340 | Mills et al. | Apr. 29, 1941 |